United States Patent
Kenyon et al.

(10) Patent No.: US 12,314,876 B2
(45) Date of Patent: May 27, 2025

(54) METHOD AND SYSTEM FOR FACILITATING CONVERGENCE

(71) Applicant: Microsoft Technology Licensing, LLC, Redmond, WA (US)

(72) Inventors: Heidi Kenyon, Bellingham, WA (US); Choo Yei Chong, Redmond, WA (US); Megan Elizabeth Slater, Seattle, WA (US); Christopher Michael Dollar, Renton, WA (US); Wende Ellen Copfer, Woodinville, WA (US); Venkata Sreekanth Kannepalli, Redmond, WA (US); Shabnam Erfani, Kirkland, WA (US); Amy Lieh-An Huang, Seattle, WA (US); Neha Parikh Shah, Glen Ridge, NJ (US); Edward Michael Doran, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/707,710

(22) Filed: Mar. 29, 2022

(65) Prior Publication Data
US 2023/0186248 A1 Jun. 15, 2023

Related U.S. Application Data

(60) Provisional application No. 63/289,440, filed on Dec. 14, 2021.

(51) Int. Cl.
*G06Q 10/0631* (2023.01)
*G06N 5/04* (2023.01)
(Continued)

(52) U.S. Cl.
CPC ........... *G06Q 10/0631* (2013.01); *G06N 5/04* (2013.01); *G06N 20/00* (2019.01); *G06Q 10/1095* (2013.01)

(58) Field of Classification Search
CPC ...................... G06Q 10/0631; G06Q 10/1095
See application file for complete search history.

(56) References Cited

U.S. PATENT DOCUMENTS 8,965,967 B2  2/2015 Gilbert et al.
9,226,105 B2  12/2015 Turgman et al.
(Continued)

FOREIGN PATENT DOCUMENTS

EP    3847600 A1    7/2021

OTHER PUBLICATIONS

Cross, Rob, Nitin Nohria, and Andrew Parker. "Six myths about informal networks—and how to overcome them." MIT Sloan Management Review (2002). (Year: 2002).*
(Continued)

*Primary Examiner* — Andre D Boyce
(74) *Attorney, Agent, or Firm* — NovoTechIP International PLLC

(57) ABSTRACT

A system and method for facilitating convergence includes receiving data relating to a first user's history of connections with other users, receiving contextual data about the first user, the contextual data including organizational graph data, providing the data and the contextual data as inputs to a trained machine-learning (ML) model for identifying a second user for the first user to connect with based on the data and the contextual data, receiving the identified second user as an output from the trained ML model, and providing the identified second user as a connection suggestion for display in a user interface element.

19 Claims, 10 Drawing Sheets

(51) Int. Cl.
  *G06N 20/00*  (2019.01)
  *G06Q 10/1093*  (2023.01)

(56) References Cited

U.S. PATENT DOCUMENTS

| | | | |
|---|---|---|---|
| 9,955,318 | B1 | 4/2018 | Scheper et al. |
| 10,361,981 | B2* | 7/2019 | Bennett .................. G06Q 10/06 |
| 10,510,026 | B1* | 12/2019 | Adamson ................ G06F 9/543 |
| 10,845,791 | B2 | 11/2020 | Cohen et al. |
| 10,922,663 | B2 | 2/2021 | Chittaluru et al. |
| 10,985,938 | B2 | 4/2021 | Krasadakis |
| 11,138,862 | B2 | 10/2021 | Vanblon et al. |
| 11,164,159 | B2 | 11/2021 | Ma et al. |
| 11,587,210 | B1 | 2/2023 | Chen et al. |
| 2006/0161447 | A1 | 7/2006 | Ohollearn et al. |
| 2009/0055270 | A1 | 2/2009 | Magdon-Ismail et al. |
| 2009/0193217 | A1 | 7/2009 | Korecki et al. |
| 2010/0287011 | A1 | 11/2010 | Muchkaev |
| 2011/0106573 | A1 | 5/2011 | Mcnamara |
| 2011/0112875 | A1 | 5/2011 | Johnson et al. |
| 2012/0290336 | A1 | 11/2012 | Rosenblatt et al. |
| 2014/0058778 | A1 | 2/2014 | Mclarty et al. |
| 2014/0059130 | A1 | 2/2014 | Sheinfeld |
| 2015/0193819 | A1 | 7/2015 | Chang |
| 2017/0017928 | A1 | 1/2017 | Miller et al. |
| 2017/0249714 | A1 | 8/2017 | Van Hoof et al. |
| 2017/0293851 | A1* | 10/2017 | Chawla .................. G06N 5/048 |
| 2017/0308866 | A1* | 10/2017 | Dotan-Cohen .... G06Q 10/1095 |
| 2017/0357904 | A1 | 12/2017 | Adler et al. |
| 2017/0357951 | A1 | 12/2017 | Patel et al. |
| 2018/0107987 | A1 | 4/2018 | Mackenzie et al. |
| 2018/0109574 | A1* | 4/2018 | Vigoda .................. G06N 20/00 |
| 2018/0114177 | A1* | 4/2018 | Somech ......... G06Q 10/063118 |
| 2018/0115170 | A1 | 4/2018 | Bacarella et al. |
| 2018/0218734 | A1* | 8/2018 | Somech .................. G10L 15/26 |
| 2018/0268337 | A1* | 9/2018 | Miller .................. G06Q 10/109 |
| 2018/0285827 | A1* | 10/2018 | Dotan-Cohen ...... G06Q 10/063 |
| 2018/0374004 | A1 | 12/2018 | Eone et al. |
| 2019/0130367 | A1 | 5/2019 | Pell et al. |
| 2019/0138653 | A1* | 5/2019 | Roller ..................... G06F 40/35 |
| 2019/0318032 | A1* | 10/2019 | Vangala ............... G06F 16/3329 |
| 2019/0340554 | A1* | 11/2019 | Dotan-Cohen .. G06Q 10/06313 |
| 2020/0110519 | A1* | 4/2020 | Vangala .................. G06F 9/453 |
| 2020/0110623 | A1* | 4/2020 | Vangala .................. G06Q 10/06 |
| 2020/0118045 | A1 | 4/2020 | Chung et al. |
| 2020/0213006 | A1 | 7/2020 | Graham et al. |
| 2020/0234523 | A1 | 7/2020 | Ma et al. |
| 2020/0274726 | A1* | 8/2020 | Setteboun ........... G06F 3/04817 |
| 2020/0287736 | A1* | 9/2020 | Zhuk ...................... G06N 20/00 |
| 2020/0311635 | A1 | 10/2020 | Emig et al. |
| 2020/0334642 | A1* | 10/2020 | Vaananen ............... G06N 20/00 |
| 2020/0401661 | A1* | 12/2020 | Kota ....................... G06N 20/00 |
| 2021/0209562 | A1* | 7/2021 | Lange ................ G06Q 10/1095 |
| 2021/0224754 | A1 | 7/2021 | Zarakas et al. |
| 2021/0256084 | A1* | 8/2021 | Marsh .................... G06Q 40/06 |
| 2021/0319408 | A1 | 10/2021 | Jorasch et al. |
| 2021/0399911 | A1 | 12/2021 | Jorasch et al. |
| 2021/0406840 | A1 | 12/2021 | Deluca |
| 2022/0005275 | A1* | 1/2022 | Atlas ..................... G06F 3/0482 |
| 2022/0014571 | A1* | 1/2022 | Polish ................. H04L 65/1093 |
| 2023/0162128 | A1 | 5/2023 | Jerome |
| 2023/0186189 | A1 | 6/2023 | Kenyon et al. |
| 2023/0186247 | A1 | 6/2023 | Kenyon et al. |

OTHER PUBLICATIONS

Edge, Darren, et al. "Workgroup Mapping: Visual Analysis of Collaboration Culture." arXiv preprint arXiv:2005.00402 (2020). (Year: 2020).*

"What is Meeting Room Booking Software & How to Implement It?", Retrieved From: https://www.workinsync.io/what-is-meeting-room-booking-software-and-how-to-implement-it/#content-1, Oct. 4, 2021, 8 Pages.

"CoWrks Launches 'Converge'—India's First Ever Sophisticated Solution for Business Gatherings and Events", Retrieved From: https://www.prnewswire.com/in/news-releases/cowrks-launches-converge-india-s-first-ever-sophisticated-solution-for-business-gatherings-and-events-866363895.html, Mar. 29, 2019, 02 Pages.

"International Search Report and Written Opinion Issued in PCT Application No. PCT/US22/044055", Mailed Date: Nov. 25, 2022, 15 Pages.

"International Search Report and Written Opinion Issued in PCT Application No. PCT/US22/044953", Mailed Date: s.s (Ms# 411203-WO-PCT).

"International Search Report and Written Opinion Issued in PCT Application No. PCT/US22/046346", Mailed Date: Nov. 28, 2022, 15 Pages.

"Non Final Office Action Issued in U.S. Appl. No. 17/707,641", Mailed Date: Oct. 24, 2023, 35 Pages.

Ashbrook, et al., "Learning Significant Locations and Predicting User Movement with GPS", In Proceedings of Sixth International Symposium on Wearable Computers, Oct. 10, 2022, 8 Pages.

"Non-Final Office Action Issued in U.S. Appl. No. 17/707,779", Mailed Date: Oct. 6, 2023, 8 Pages.

Notice of Allowance mailed on Feb. 16, 2024, in U.S. Appl. No. 17/707,779, 08 pages.

Aliannejadi, et al., "Personalized ranking for context-aware venue suggestion." Proceedings of the Symposium on Applied Computing, pp. 960-962.

Final Office Action mailed on Mar. 18, 2024, in U.S. Appl. No. 17/707,641, 44 pages.

Non-Final Office Action mailed on Dec. 16, 2024, in U.S. Appl. No. 17/707,641, 49 Pages.

Zhang, et al., "Hybrid EGU-based group event participation prediction in event-based social networks", Knowledge-Based Systems, vol. 143, Mar. 1, 2018, pp. 19-29.

Notice of Allowance mailed on Apr. 4, 2025, in U.S. Appl. No. 17/707,641, 18 pages.

Zhang et al., "GEVR: An Event Venue Recommendation System for Groups of Mobile Users", Proceedings of the ACM on Interactive, Mobile, Wearable and Ubiquitous Technologies, vol. 3, No. 1, Article 34, Mar. 2019, 25Pages.

* cited by examiner

METHOD AND SYSTEM FOR FACILITATING CONVERGENCE

CROSS-REFERENCE TO A RELATED APPLICATION

This patent application claims the benefit of priority to U.S. Provisional Application No. 63/289,440 entitled "Method and System for Facilitating Convergence," filed on Dec. 14, 2021, the entirety of which is incorporated herein by reference.

BACKGROUND

In today's hectic and fast-paced life, it is often difficult for individuals to keep track of the amount of time passed since they last connected with a person or identify new people that they need to form a connection with. People often stay connected to a few people they work closely or are close friends with, even though connections with other individuals may be desirable and/or beneficial for them. However, remembering to stay connected with or to initiate new connections is often challenging. Moreover, determining how to connect with old or new connections is time consuming and often difficult.

Furthermore, when scheduling meetings and gatherings, an organizer can easily forget to include important and/or useful meeting participants. Still further, it is often difficult for people to notice how their social and/or work circles are limited to specific demographic groups and/or how to expand those circles to other groups. Moreover, identifying opportunities for a connection with people who have different schedules and/or work from or live in different geographical locations is often challenging.

Hence, there is a need for improved systems and methods of facilitating convergence between individuals.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving data relating to a first user's history of connections with other users, receiving contextual data about the first user, the contextual data including organizational graph data, providing the data and the contextual data as inputs to a trained machine-learning (ML) model for identifying a second user for the first user to connect with based on the data and the contextual data, receiving the identified second user as an output from the trained ML model, and providing the identified second user as a connection suggestion for display in a user interface element.

In yet another general aspect, the instant disclosure presents a method for facilitating convergence. In some implementations, the method includes receiving data relating to a first user's history of connections with other users, receiving contextual data about the first user, the contextual data including organizational graph data, providing the data and the contextual data as inputs to a trained ML model for identifying a second user for the first user to connect with based on the data and the contextual data, receiving the identified second user as an output from the trained ML model, and providing the identified second user as a connection suggestion for display in a user interface element.

In a further general aspect, the instant application describes a non-transitory computer readable medium on which are stored instructions that when executed cause a programmable device to perform functions of receiving data relating to a first user's history of connections with other users, receiving contextual data about the first user, the contextual data including organizational graph data, providing the data and the contextual data as inputs to a trained machine-ML model for identifying a second user for the first user to connect with based on the data and the contextual data, receiving the identified second user as an output from the trained ML model, and providing the identified second user as a connection suggestion for display in a user interface element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
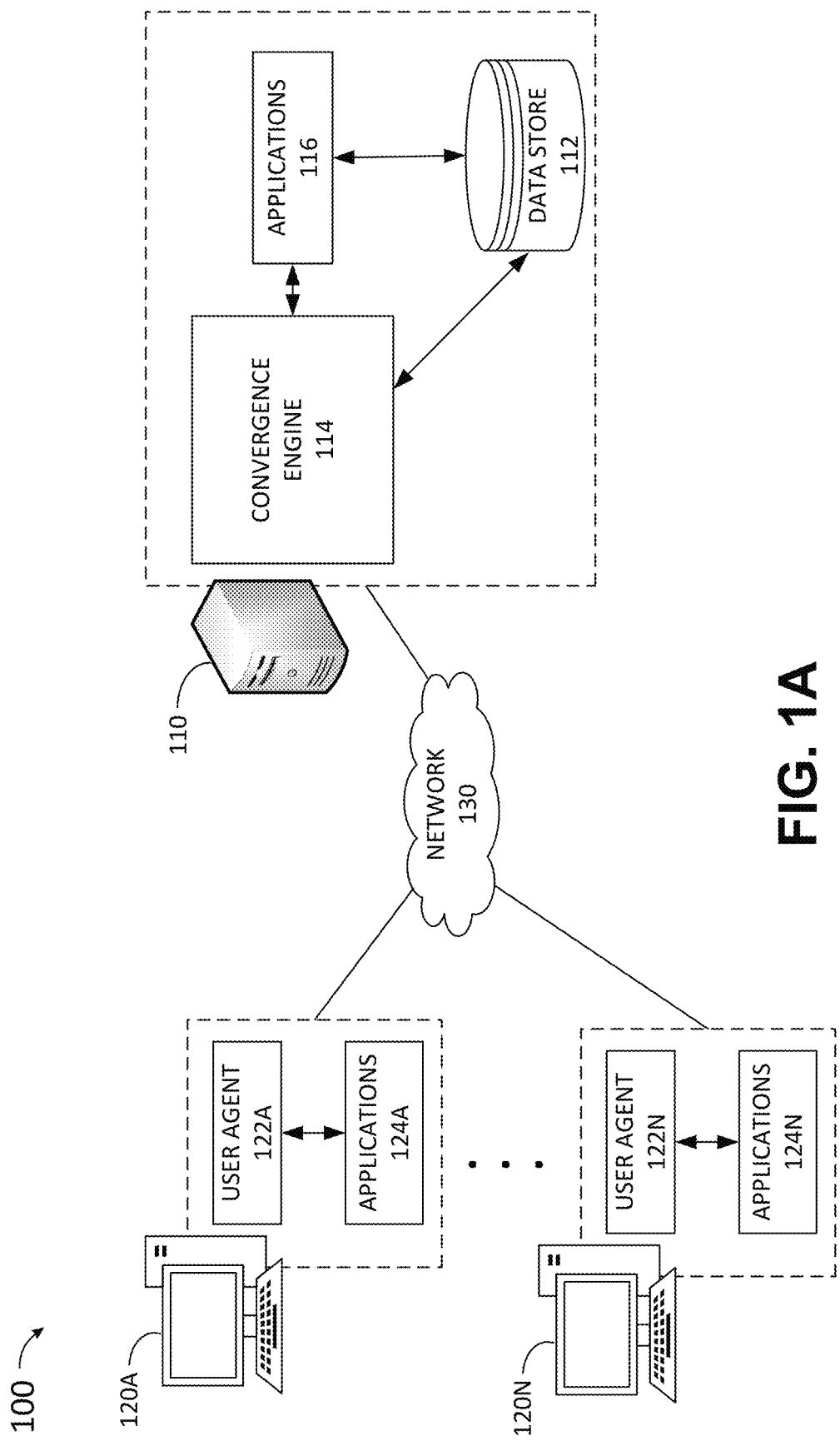
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

When organizing a meeting or gathering, it often takes time and effort to think about and identify all the appropriate individuals that should be invited to the meeting. Additionally, most individuals tend to connect with a small group of coworkers or friends with whom they are often in touch. This is usually the result of busy schedules and convenience of staying connected with a small group with whom you interact frequently. Thus, while people may be interested in connecting with others and such a connection may be desirable for personal and/or career objectives, it is often difficult to remember or know who to connect with and/or how to connect with them. Furthermore, sometimes individuals do not realize that they have not been in touch with an important connection in a long time or that a meaningful connection is weakening. Still further, most individuals may not be aware of unconscious bias in their connections. Even if people are aware of these issues, it is often difficult for people to determine how to expand their circles, when and/or how to reach out to individuals with whom they should connect, and/or find an opportunity to connect with people.

While existing technologies such as digital calendars, email applications and/or contact lists may be useful in keeping track of some connections, it is often very time-consuming to look through numerous messages, contact lists, calendar dates and/or other communications to determine if it has been a long time since a connection with a specific person has been made. It is even more challenging to identify individuals with whom a person should connect but has not made a connection with, in the past. Thus, currently available mechanisms for identifying individuals to connect and/or meet with require a lot of human input, interaction and analysis. Furthermore, often after an individual has been identified, they have to be contacted to determine their availability for an opportunity to connect. This may result in multiple back and forth communications to identify a convenient time, mode of connection (e.g., in-person, over the phone, or online), and/or a place for connecting with the individual. As such, there exists a technical problem of lack of mechanisms for automatically identifying individuals that a user should establish a connection with or remain connected to, and for identifying ways in which to establish a connection with others that optimizes different parties' time.

To address these technical problems and more, in an example, this description provides technical solutions for automatically identifying individuals for a user to connect with based on factors such as a weakening connection link, unconscious bias, user's career goals, project and work requirements, proximity and the like. This may involve retrieving data relating to a user's projects or other objectives, identifying users with whom the user should remain in contact based on their career, project, company or other objectives, retrieving messages (e.g., email messages, instant massage, and/or text messages) or calendar data, calculating the length of time the user has not been contact with each user identified as being a user with whom they should remain in contact, and determining based on the amount of time, if a connection suggestion should be made. In some implementations, this determination takes geographical proximity into account to identify opportunities for making a connection. For example, if the technical solution determines that two users who should be connected have not been in contact for a given time period and are currently within a given geographical proximity with each other (e.g., in the same building), a connection suggestion may be made. The technical solution may also identify potential individuals who should be invited to a meeting or gathering, when a meeting is being scheduled. Making these determinations may involve the use of one or more machine-learning (ML) models.

The technical solutions described herein address the technical problem of inefficiencies and difficulties in identifying individuals to connect with and detecting opportunities for making a connection by providing a system and method for automatically identifying individuals a person should connect with and identifying opportunities for connection between two or more people (e.g., based on free time and/or proximity). The technical solution allows a user to be presented with connection suggestions to quickly and efficiently identify connection opportunities and/or to reach out to suggested connections, and therefore improves graphical user interfaces for electronic devices. The technical effects at least include (1) improving the efficiency of using an electronic device to converge with one or more individuals; (2) optimizing use of meeting organizer's resources and time by identifying potential meeting participants that are likely to be useful and/or needed at a meeting; (3) optimizing individuals' time and increasing chances of convergence by identifying opportunities for convergence based on proximity and/or availability of individuals; and (4) providing user interface (UI) elements that increase user efficiency and user satisfaction by enabling the user to review suggested connection opportunities, meeting participants and/or individuals to connect with.

As will be understood by persons of skill in the art upon reading this disclosure, benefits and advantages provided by such implementations can include, but are not limited to a technical solution to the technical problems of lack of adequate mechanisms for efficiently and automatically identify who and how to connect with. The benefits made available by these technology-based solutions provide automated, user-friendly and efficient mechanisms for facilitating convergence between people.

FIG. 1A illustrates an example system 100, upon which aspects of this disclosure may be implemented. The system 100 may include a server 110 which may be connected to or include a data store 112 which may function as a repository in which data sets relating to training models, user data, communications data, facility data, meeting location data and the like may be stored. Although shown as a single data store, the data store 112 may be representative of multiple storage devices and data stores which may be connected to each of the various elements of the system 100. Furthermore, although the data store 112 is shown as being part of the server 110, one or more elements (e.g., storage mediums) of the data store 112 may be provided in separate storage servers or other types of servers. Moreover, the server 110 may include a plurality of servers that work together to deliver the functions and services provided by each service or application. Server 110 may operate as a shared resource server located at an enterprise accessible by various computer client devices such as client devices 120A-120N. The server 110 may also operate as a cloud-based server for offering convergence services in one or more applications such as applications 116 and/or applications 124A-124N.

The server 110 may include and/or execute a convergence engine 114 which may provide convergence services for users utilizing an application that provides convergence capabilities on their client devices such as client device 120A-120N. The convergence engine 114 may operate to identify or predict a user's location, identify individuals a user should connect with and/or invite to a meeting based on various parameters including history of connections made in the past, user data (e.g., demographics, job titles, projects worked on, organizational graph data), location data, and/or provide mechanisms for making contact with a selected suggestion or adding a selected suggestion to a meeting invitation via one or more tools such as an application (e.g., applications 116 or applications 124). The convergence engine 114 may include one or more separate elements that perform each of the functions of location prediction/identification, connection suggestion identification, and/or connection opportunity identification, as further discussed below with respect to FIG. 1B.

Each of the client devices 120A-120N may be connected to the server 110 via a network 130. The network 130 may be a wired or wireless network(s) or a combination of wired and wireless networks that connect one or more elements of the system 100. The client devices 120A-120N may be personal or handheld computing device having or being connected to input/output elements that enable a user to interact with various applications (e.g., applications 116 or applications 124A-124N). Examples of suitable client devices 120A-120N include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail in regard to FIGS. 5 and 6.

In some implementations, each of the client devices 120A-120N is associated with a different user. One of more of the client devices 120A-120N may include one or more applications 124A-124N. Each application 124A-124N may be a computer program executed on the client device that configures the device to be responsive to user input to allow a user to use convergence tools such as scheduling a meeting, viewing other users current or future locations, viewing connection suggestions, and/or contacting a connection suggestion to facilitate convergence. In some implementations, the applications 124A-124N include a local convergence engine for providing some local convergence services. Examples of suitable applications include, but are not limited to, collaborative work environment applications, communications application (e.g., Microsoft Teams or Microsoft Outlook), and the like.

In some examples, applications used for providing convergence services are executed on the server 110 (e.g., applications 116) and are provided via an online service. In some implementations, web applications communicate via the network 130 with a user agent 122A-122N, such as a browser, executing on the client device 120A-120N. The user agent 122A-122N may provide a user interface (UI) that allows the user to interact with applications 116 and may enable applications 116 to provide data to the convergence engine 114 for processing. In some implementations, the convergence engine 114 is included in the applications 116.

Figure 1B:
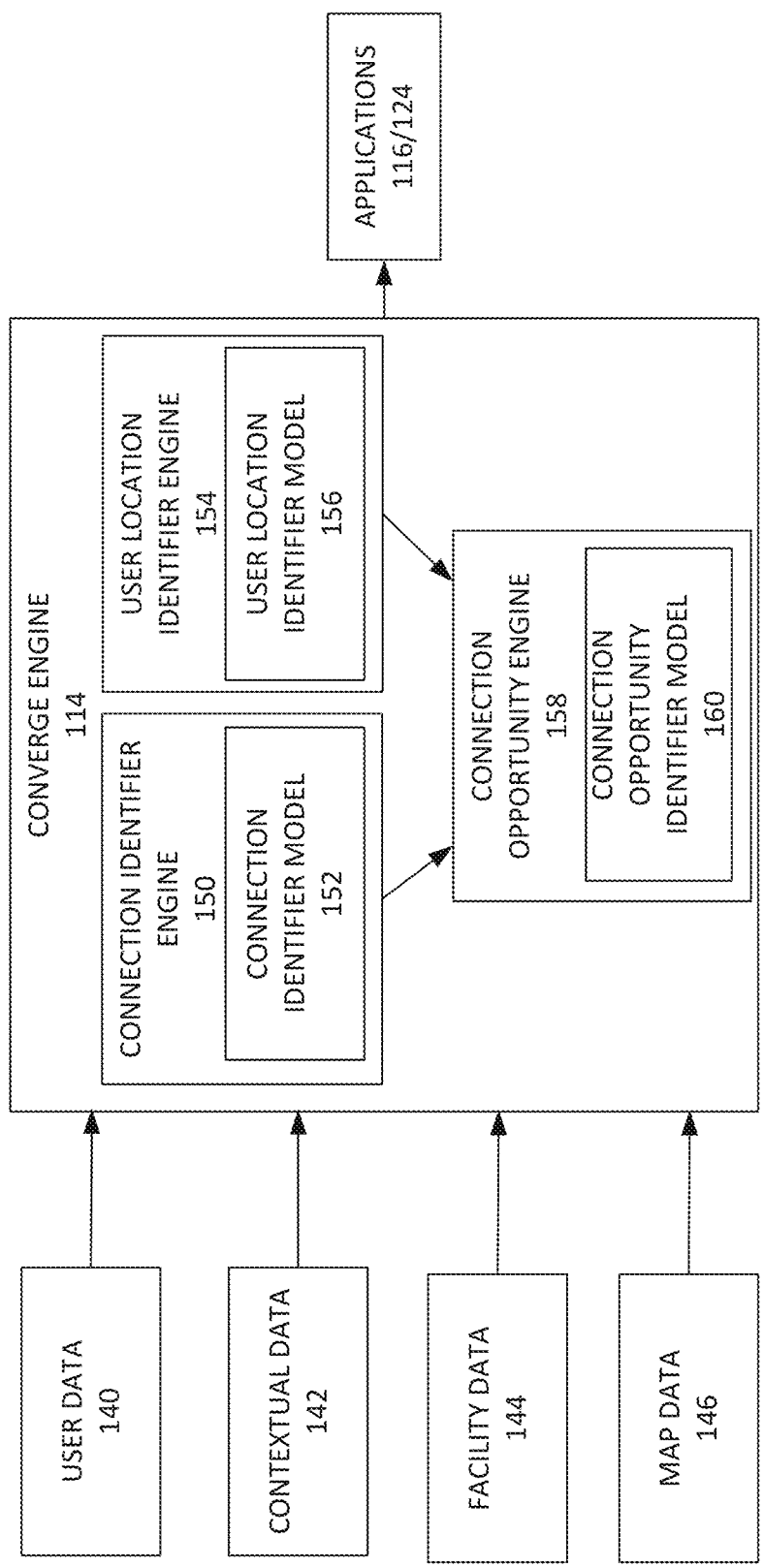
FIG. 1B depicts an example data flow between some elements of an example system upon which aspects of this disclosure may be implemented.

FIG. 1B depicts an example data flow between some of the elements of the example system 100. In some implementations, the convergence engine 114 receives user data 140, contextual data 142, facility data 144 and/or map data 146. The data may be received from a data storage medium that stores data such as the data store 112. User data 140 may include user communication history data such as email messages, instant message (e.g., chats or text messages), history of phone calls, meeting history (e.g., history of video calls or online meetings), and/or calendar data. The calendar and communications data may provide information about history of the user's connections with other users and/or history of user's geographical locations. For example, calendar data may indicate that the user usually meets with a certain individual once a month. Calendar data may also indicate that the user has a meeting at a specific location at a given point in the future. This information may also be retrieved directly from a calendar application and/or inferred from communications data (e.g., from emails, instant messages, and the like).

Moreover, user data 140 may include location data such as current location or location history data (e.g., the location at which the user is currently located and/or the location at which the user works each day of the week). Location data may be collected or inferred from a user's Internet Protocol (IP) address, GPS data, data relating to pinging a user's mobile device, network connection data (e.g., connection to a Wi-Fi in a building), health check data (e.g., when the user completes their health check at a specific building), and external data sources such as toll road data or public transportation data (e.g., train or bus tickets purchased). Location data may also be inferred from voice analysis conducted during a virtual meeting. For example, voice analysis may be performed to determine whether a user is in a conference room with other users or the user is attending the meeting remotely. Furthermore, location information may be inferred from organizational security data such as when the user uses a badge to enter a facility. It should be noted that in collecting and retrieving a user's communication and/or geographical or other private data, care is taken to ensure all privacy guidelines and regulations are followed. For example, receiving a user's consent for collection, retrieval, storage and use of their data may be required.

In addition to location information, user data 140 may include user-provided information such as job title, relationship with other users (e.g., identifying a person as a family member) and/or personal preferences such as dietary restrictions, food preferences, types of venues preferred (e.g., indoor, outdoor, small venue, large venue, quiet venue), preferred mode of transportation (e.g., car, train, bus, etc.), accessibility limitations (e.g., wheelchair accessible, ADA accessible), whether they prefer to carpool or drive by themselves, and/or a number of other user preferences and/or requirements. This information may be provided directly by the user or may be inferred from other data, as discussed in detail below. User data 140 may include data for a person for which connection suggestions are being identified as well as for other users that are somehow associated with that person (e.g., work in the same company, live in the same neighborhood, go to the same classes, share a connection with, etc.).

Contextual data 142 may include meeting data (e.g., meeting date/time, meeting participants, meeting title, etc.), organizational graph data relating to the people associated with a user, the user's title, the user's projects and the like. For example, data identifying the user's coworkers, people with whom the user frequently works on the same projects or people that the user frequently meets with in person. Furthermore, contextual data 142 may include location history or current location information of users associated with the user, the level of association between the user and other users (this information may be retrieved or inferred from other data), and/or the level of connection between the user and other users (e.g., the number of recent connections, recency of the connections, etc.).

Facility data 144 may include data collected from smart building features such as light sensors, building temperatures (e.g., when a room's temperature is changed by a user, that indicates that a user is in the room), use of a smart speaker in a room, use of a TV or other audio/video equipment, and/or use of appliances (e.g., coffee machine).

Moreover, facility data may be collected from reservation systems. For example, organizations that enable their employees to reserve a space (e.g., workspace or conference room) may collect the reservation information, along with data about the person who made the reservation and/or a list of persons that will be at the reserved space. This information can be used to determine a user's location both in the past and in the future and/or identify the people the user is meeting with.

The map data 146 may include data related to geographical positions of various potential meeting locations, routes from and to one or more of the geographical positions, directions, route information, traffic information and the like. The map data 146 may be used to calculate distances between various positions to identify potential connection opportunities. The map data 146 may be retrieved from sources that provide map related information. In some implementations, this information is provided via an API that offers access to a map application.

Once the required user data 140, contextual data 142, facility data 144 and/or map data 146 have been received or retrieved by the convergence engine 114, some or all of the received data may be provided to a connection identifier engine 150 for identifying one or more users with which a given user should converge. The connection identifier engine 150 may analyze the received data, including communications data to identify patterns in the user's communications and determine based on the patterns if a connection is weakening and/or need to be strengthen or if new connections should be made. This determination may be rule-based and/or it may be made by one or more ML models such as the connection identifier model 152. In an example, the connection identifier engine 150 examines the user's communications with people closely associated with the user (e.g., the user's boss, direct report, team member, family member and the like) and/or the people the user regularly connects with, to determine when a connection is being weakened. For example, if the user normally meets once or more times a week with his boss, but has not had a meeting with them in a few weeks, a rule-based logic may determine that the connection is weakening and/or convergence with that connection is needed. In a different example, if the user normally connects with his direct reports once a month, but other people with similar job titles and/or in the same company connect with their direct reports a few times a month, the connection identifier model 152 may determine that the user would benefit from more convergence with his/her direct reports. Once such a determination is made, the connection identifier model 152 may provide data related to the suggested connection to applications 116/124 for display to the user. For example, the connection identifier model 152 may provide an output identifying the person with whom connection is weakening or a more frequent convergence is recommended, the amount of time that has passed since the last convergence, and/or a recommended frequency of convergence. For example, the connection identifier model 152 may identify the user's boss as a weakened connection, and provide the boss's information, the last time the user and the boss met in person or had an online meeting, and a recommendation that the user meet with his/her boss at least once a week.

In some implementations, the connection identifier model 152 examines the user's history of convergence to identify limitations in the user's connection circle. For example, the connection identifier model 152 may determine that all of the user's connections are with a certain demographic of people or are with people having specific job titles (e.g., only executives in a company). This may point to unconscious bias or may be counterproductive to the user's career or personal objectives. As a result, the connection identifier model 152 may look for people outside of the user's connection circle who share some similarities with the user (e.g., work on the same types of projects, have the same job title, work in the same building), with whom people with similar characteristics often converge (e.g., people with similar job titles often converge with people from a certain team) and/or a connection with whom may be beneficial to the user. The connection identifier model 152 may then identify those people as suggested connections for the user. In an example, the suggested connections are provided as an output of the connection identifier model 152 to the applications 116/124.

The connection identifier engine 150 may also receive meeting data (e.g., as part of user data 140 or contextual data 142) and identify people who should be invited to the meeting based on one or more parameters. For example, the connection identifier engine 150 may examine the meeting title (e.g., the project or team it relates to), list of meeting invitees, meeting organizer, meeting time/date and/or meeting location to identify people who are associated with the meeting topic (e.g., work on the same project), normally work with one or more of the meeting invitees or meeting organizer, will be located within a given geographic distance of the meeting location and/or are available (e.g., based on their calendar data) at the meeting time. The identified meeting candidates may then be provided as an output to the applications 116/124 for display to the user.

In some implementations, the user data 140, contextual data 142, facility data 144, map data 146 and/or suggested connections identified by the connection identifier engine 150 are also provided to a user location identifier engine 154 for identifying one or more users' locations. This may include identifying a user's current location and/or predicting the user's future location. When location information is available from a user's calendar or from a reservation system (e.g., the user has a meeting scheduled at a specific location or has reserved a space at a specific time), the user location identifier engine 154 may use the information to determine the user's current location or predict the user's future location. When, however, location information is not directly available, the user location identifier engine 154 may intelligently determine the user's current or future location using the user data 140 (e.g., current or past location data), contextual data 142, facility data 144 and/or map data 146. This may involve use of one or more ML models, such as the user location identifier model 156, for predicting the user's location based on past behavior and/or patterns in user behavior.

As a general matter, the methods and systems described herein may include, or otherwise make use of an ML model to, analyze various parameters relating to user location, user associations, meeting locations and/or facility usage. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various users and/or user actions, predict user locations, identify convergence opportunities and the like. Such training may be made following the accumulation, review, and/or analysis of data (e.g., user data and facility data) over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequently trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The user location identifier model 156 may receive the user data 140, contextual data 142, facility data 144 and/or map data 146 as inputs and analyze the data to determine or predict one or more user's current or future locations based on patterns in user behavior and/or other parameters. For example, the user location identifier model 156 may examine user data 140 and facility data 144 to determine that a user often works from a specific office building on Tuesday mornings. Based on this information, the user location identifier model 152 may predict that the user will be located at that office building next Tuesday morning. The user identifier model 152 may then utilize user data 140 (e.g., calendar data) to determine that a suggested connection for the user will be in the same office building next Tuesday morning. This information may then be provided to the connection opportunity engine 158 to identify connection opportunities for the user and the suggested connection, as further discussed below.

In some implementations, the connection opportunity engine 158 receives user data 140, contextual data 142, facility data 144, map data 146, suggested connections and/or user location data as inputs. The connection opportunity engine 158 may then analyze data related to suggested connections and/or predicted or current locations of users to identify opportunities for convergence between users. In an example, the connection opportunity engine 158 analyzes current and/or predicted locations of users that are associated with one another (e.g., work together, are on the same team, belong to the same social circle, the like), examines the convergence history of the users and determines based on the convergence history, relationship between the users and the location data, that a convergence between two or more users who are or will be within a given geographical proximity from each other would be beneficial to them. This determination may be made by using one or more ML models such as the connection opportunity identifier model 160. Information about the geographical proximity or distance between users may be determined from the map data 146 and/or facility data 144.

The connection opportunity engine 158 may also simply examine the list of suggested connections along with the current or future predicted locations of the suggested connections to determine when the user and the suggested connections will be within a given geographical proximity to one another. The identified time window (e.g., connection opportunity) may then be provided as an output of the connection opportunity engine 158 to applications 116/124 for display to the user. The applications 116/124 may then provide a notification to the user that convergence with a person is recommended and an opportunity for convergence is available in the identified time window. For example, if a user's team member who the user works closely with normally works remotely but is planning on being in the office next Tuesday and the user has not met with the team member for some time, the connection opportunity engine 158 may provide data identifying next Tuesday as a connection opportunity with the team member. In an example, once the connection opportunity is identified, a notification is provided to both users to inform them of their geographical proximity to one another at the given time. Alternatively, a notification is only provided to one of the users (e.g., the user who has requested receiving connection opportunity suggestions). It should be noted that in providing notifications about geographical locations of individuals, care must be taken to ensure compliance with privacy guidelines and regulations. For example, explicit user consent may be required before a user's predict or current geographical location is shared with another user.

In some implementations, the applications 116/124 display the identified or predicted locations of the user and the suggested connection on a map. Map information may be provided by the map data 146 and/or via a website or application that provides such information. In an example, the map display data is accessed via an API. This may be achieved by the convergence engine 114 and/or by the applications 116/124.

In this manner, the convergence engine 114 may enable efficient and effective convergence between multiple users by enabling connections to take place with the right people. This is made possible by being able to automatically identify individuals with whom a user have a weakening connection or would benefit from new connection and/or determining users' locations to automatically identify connection opportunities. In this manner, the technical solution increases user efficiency and satisfaction and increases individual's opportunity meaningful convergence.

Figure 2:
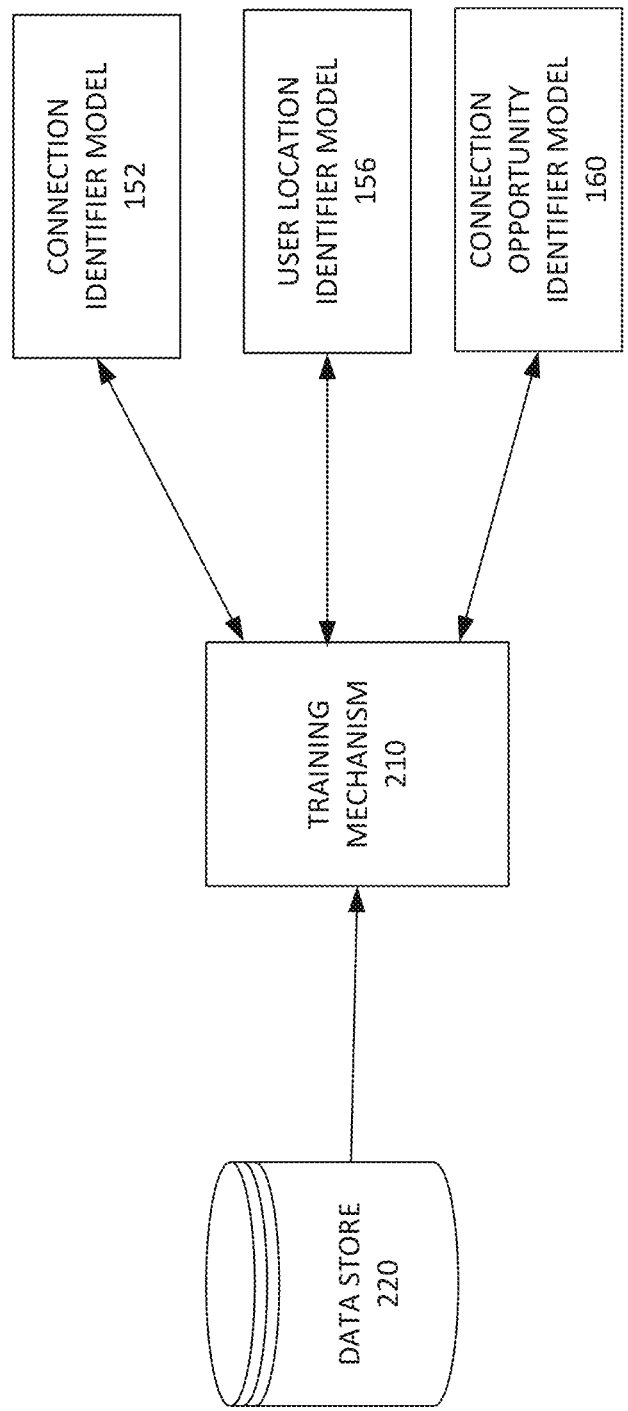
FIG. 2 depicts how one or more ML models used by a convergence engine may be trained.

FIG. 2 depicts how one or more ML models used by the convergence engine 114 may be trained by using the training mechanism 210. The training mechanism 210 may use labeled and/or unlabeled training data sets stored in the data store 220 to provide initial and ongoing training to the connection identifier model 152, user location identifier model 156 and/or connection opportunity identifier model 160. In some implementations, the training mechanism 210 uses labeled training data to train one or more of the models via deep neural network(s) or other types of ML models. The initial training may be performed in an offline stage. Additionally, and/or alternatively, the one or more ML models may be trained using batch learning.

In some implementations, to provide ongoing training, the training mechanism 210 may use training data sets received from each of the ML models. Furthermore, data may be provided from the training mechanism 210 to the data store 220 to update one or more of the training datasets in order to provide updated and ongoing training. Additionally, the training mechanism 210 may receive training data such as knowledge from pre-trained mechanisms.

Figure 3A:
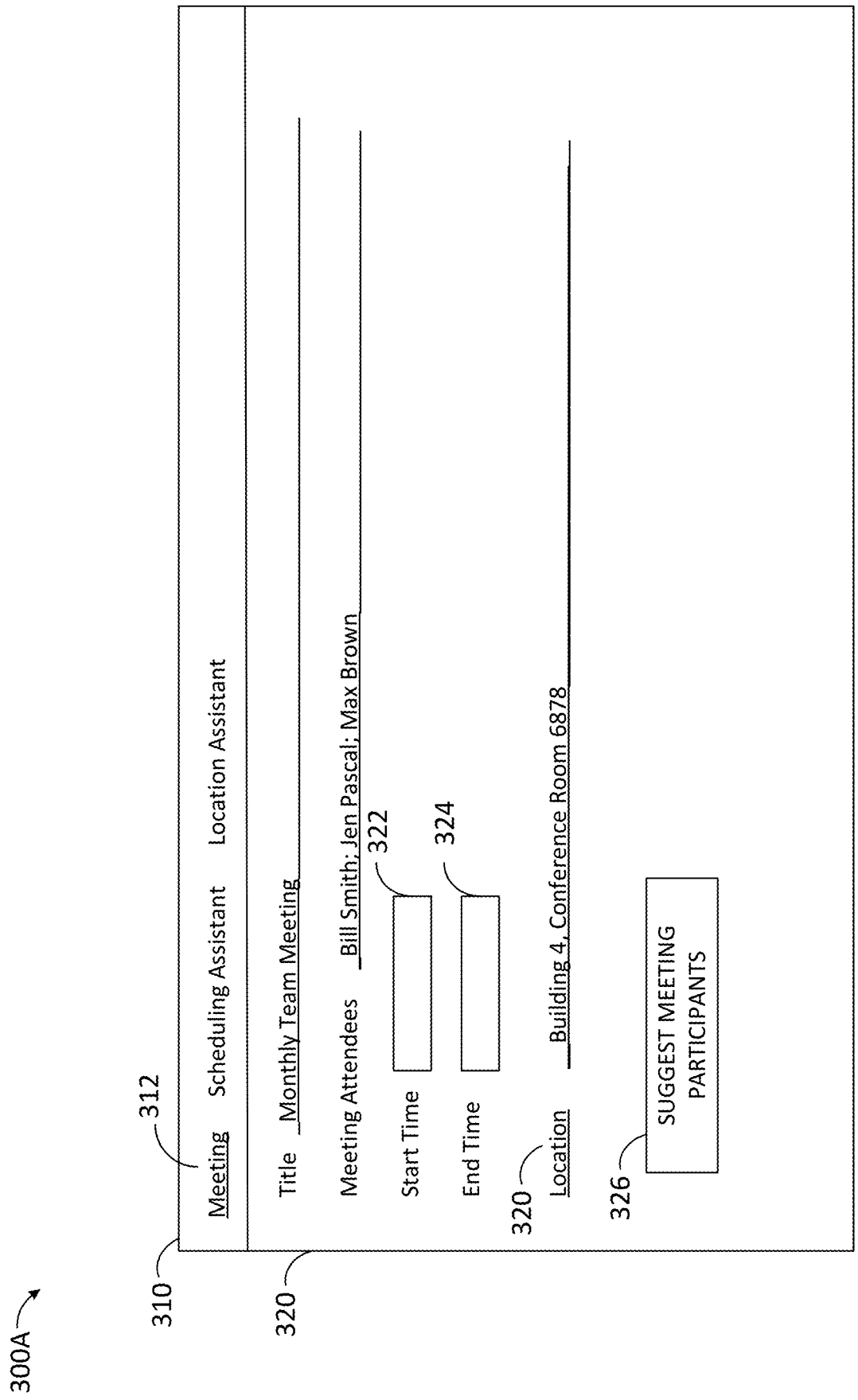
FIGS. 3A-3D depict example graphical user interface (GUI) screens of an application or service that facilitates convergence.
Figure 3B:
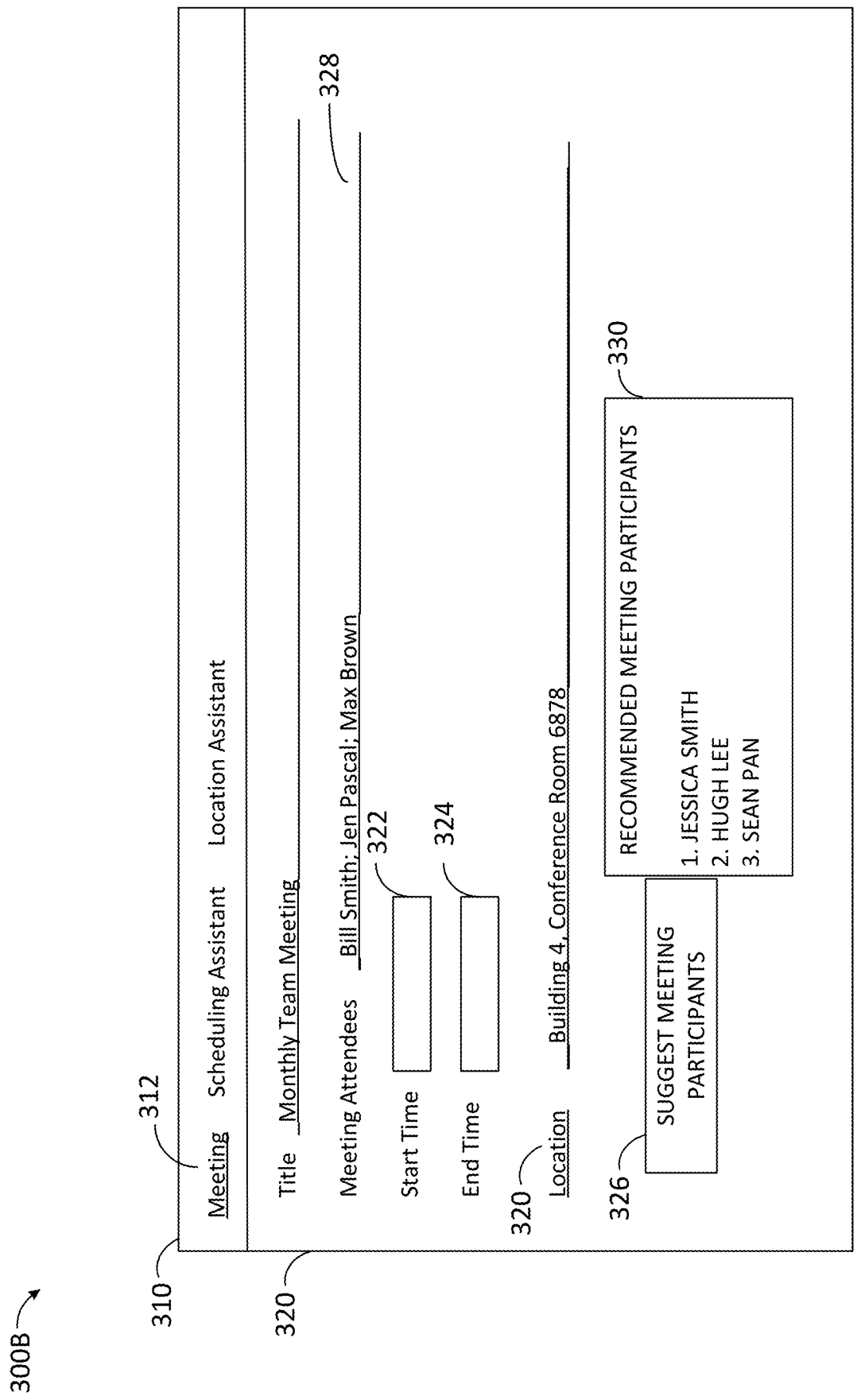

FIGS. 3A-3D depict example GUI screens of an application or service that facilitates convergence. FIG. 3A depicts an example GUI screen 300A of a calendar management application or communications application (e.g., Microsoft Outlook or Microsoft Teams) displaying an example meeting scheduling feature. GUI screen 300A may be displayed by an application that provides a feature for scheduling a meeting when the user selects a UI element for scheduling a new meeting or editing an already scheduled meeting. The GUI screen 300A may include a toolbar menu 310 displaying a number of tabs related to various aspects of scheduling a meeting. Selecting each tab of the toolbar menu 310 may result in display of different menu options. In an example, the meeting tab 312 displays the screen portion 320, which may include UI elements for entering a meeting title, inputting the names and/or contact information (e.g., email addresses) of the people that are being invited to the meeting, and UI elements 322 and 324 for selecting a start time/date and end time/date for the meeting. Additionally, the screen portion 320 may include a UI element 320 for entering a selected meeting location.

The GUI screen 300A may also include a UI element 326 to initiate the process of identifying potential meeting participants for the meeting. Once the UI element 326 is selected, the application displaying the GUI screen 300A may transmit user data and/or contextual data about the meeting, currently inputted meeting participants, meeting location and the like to a convergence engine such as the convergence engine 114 of FIGS. 1A-1B to assist in identifying potential meeting participants to invite to the meeting. In an example, upon selecting the UI element 326, a pop-up menu such as the UI element 330 of GUI screen 300B in FIG. 3B may be displayed that presents a list of one or more suggested meeting participants.

Suggested meeting participants may be added to the meeting attendee list by simply selecting their names in the UI element 330. For example, clicking on a name displayed in the UI element 330 may result in the automatic insertion of the selected person's name in the meeting attendee list. In some implementations, suggested meeting attendees may be displayed automatically upon selection of the meeting attendee input UI element 328. For example, when a user clicks on the input line of the UI element 328 to begin entering the names of meeting attendees, one or more meeting attendee suggestions may be displayed in a UI element from which the user may quickly and efficiently select meeting attendees to add to the list.

Figure 3C:
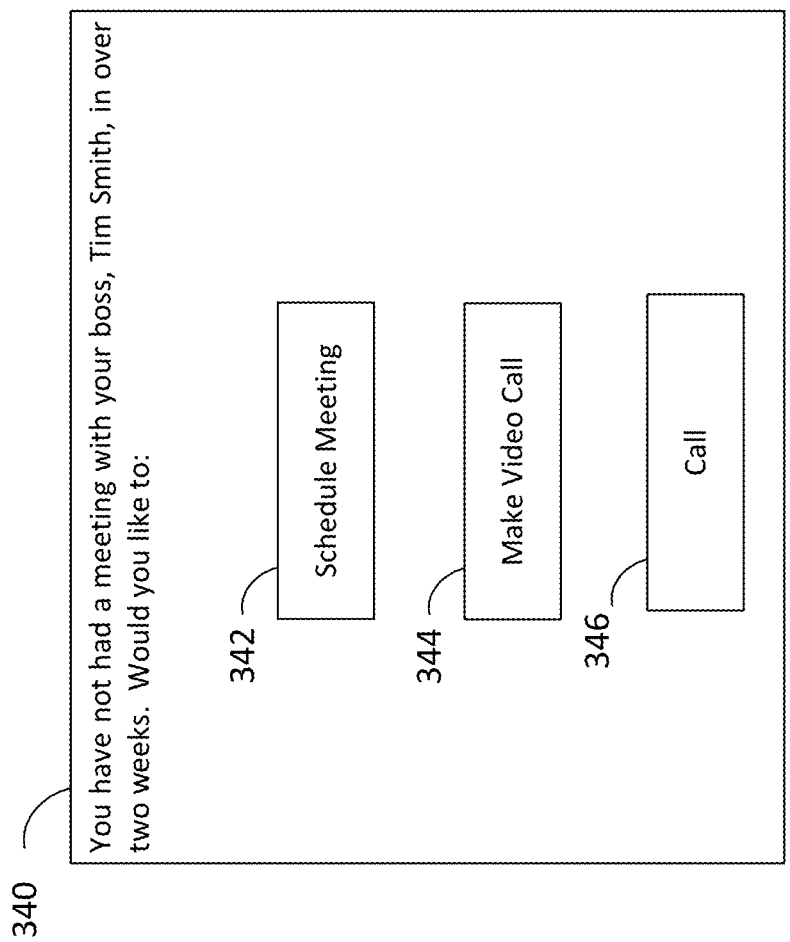

FIG. 3C displays a UI element 340 which may be displayed by a convergence application to notify the user of suggestions for convergence. In an example, the notification may be displayed when the user submits a request for receiving convergence suggestions (e.g., clicking on a menu option for displaying convergence suggestions) or may be displayed to users who have subscribed to and/or consented to receiving convergence suggestions. The notification may be generated when a convergence engine (which may run by a server in the background) identifies a weakening connection and/or a connection which is likely to be of benefit to the user.

The UI element 340 may display identifying information (e.g., name) for the suggested connection and may include information about the length of time passed since the last connection with the suggestion was made. In some implementations, the UI element 340 may also display the type of connection suggested or the type of connection that was last made (e.g., email, in-person meeting, online meeting, etc.). The UI element 340 may also include additional features that enable the user to quickly and efficiently initiate convergence from the same screen. For example, the UI element 340 includes a UI element 342 (e.g., button) for scheduling a meeting with the suggested connection. Selecting the UI element 342 may cause the display of a meeting scheduling GUI screen and/or a calendar screen that displays the connection's calendar and availability. The UI element 340 may also include a UI element 344 (e.g., button) for making a video call to the suggested connection directly from the same screen. Selecting the UI element 340 may cause the display of a communications applications that enables video calls which may display the name and/or contact information of the suggested connection for initiating a video call.

The UI element 340 may also include a UI element 346 (e.g., button) for a making a call to the suggested connection. Selecting the UI element 340 may cause the display of a communications applications that enables voice calls. The communications application may display the name and/or contact information of the suggested connection for initiating a call. In some implementations, the UI element 340 may enable other modes of communication with the suggested connection such as sending an email or sending an instant message.

Figure 3D:
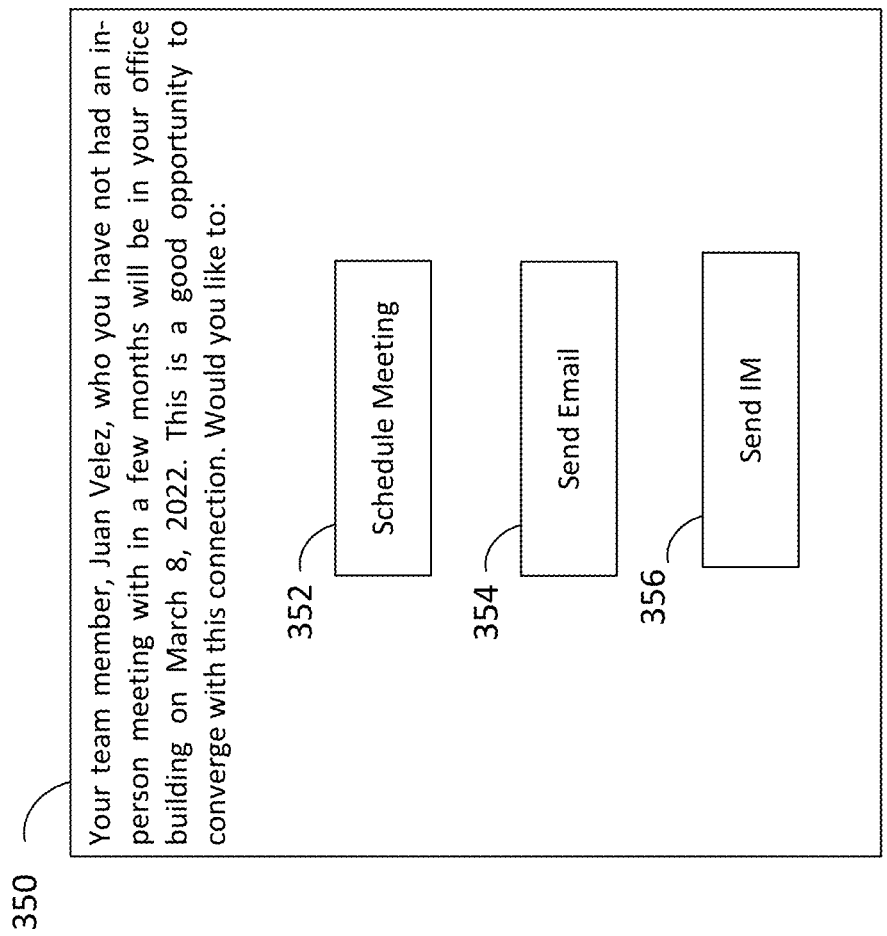

FIG. 3D displays a UI element 350 which may be displayed by a convergence application to notify the user of connection opportunities. The notification may be displayed when the user submits a request for receiving convergence suggestion opportunities (e.g., clicking on a menu option for displaying convergence suggestion opportunities) or may be displayed to users who have subscribed to and/or consented to receiving convergence suggestions. The notification may be generated when a convergence engine (which may run by a server in the background) identifies a convergence opportunity with a connection. The notification may be displayed by the convergence application, or it may be displayed by a communications application. In an example, the notification is presented as a message to the user (e.g., an email message or instant message is sent to the user).

The UI element 350 may notify the user of the connection opportunity by informing the user of the time/date at which the suggested connection will be available and/or within a geographical vicinity of the user. The UI element 350 may also include identifying information for the suggested connection (e.g., name and relationship with the user). Moreover, the UI element 350 may provide information about the length of time since the last connection with the suggested connection was made and/or the type of connection.

In order to enable the user to quickly and efficiently initiate convergence, the UI element 350 may also include menu options for initiating convergence. In an example, the UI element 350 includes a UI element 352 (e.g., button) for scheduling a meeting with the suggested connection. Selecting the UI element 352 may cause the display of a meeting scheduling GUI screen and/or a calendar screen that displays the connection's calendar and availability. In an example, the meeting scheduling GUI screen may have the time/date and/or location fields already filled out with the suggested connection's name, available time/date and/or suggested location.

The UI element 340 may also include a UI element 354 (e.g., button) for making sending an email to the suggested connection and a UI element 356 for sending an instant message to the suggested connection. Selecting the UI element 354 may cause the display of a new email message with the TO field being already filled out with the suggested connections email address. Similarly, selecting the UI element 356 may display an instant message input box directed to the suggested connection.

Figure 4:
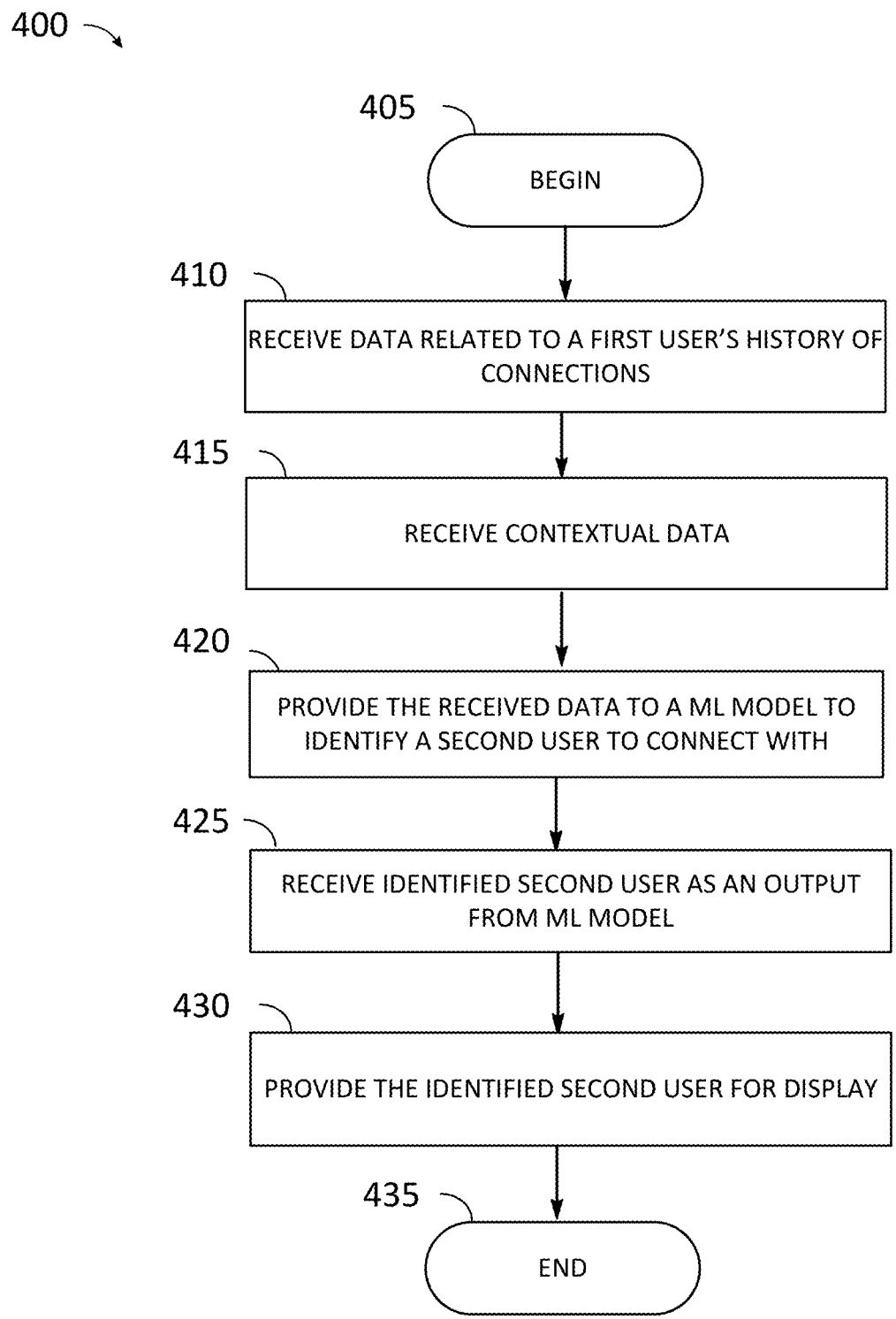
FIG. 4 is a flow diagram depicting an example method for intelligently facilitating scheduling of an in-person meeting.

FIG. 4 is a flow diagram depicting an example method 400 for intelligently identifying facilitating convergence with a connection. One or more steps of the method 400 may be performed by a convergence engine such as the convergence engine 114 of FIGS. 1A-1B or by an application such as applications 116/124 of FIGS. 1A-1B. The method 400 may begin, at 405, when a request to receive connection suggestions for meeting attendees is received. In an example, once it is determined that a user has consent to or has requested receiving connection suggestions, a method such as method 400 may run in the backend to continuously look for suggestion connections that may be presented occasionally, based on a predetermined schedule or whenever a connection suggestion with a confidence score that exceeds a given threshold is identified.

After beginning, method 400 may proceed to receive data related to history connections of a first user, at 410. This may occur, for example, as part of receiving user data. The user data for a first user may include communications data such as emails, text messages, instant message, call logs, video conference logs, calendar data and the like. In an example, the user's history of connections is collected, inferred and/or determined based on the communications data. For example, by examining email messages related to a lunch meeting, calendar data, call log or video conference log, a determination may be made that the last time the first user met with a given second user was three months ago.

Once the user's history of connections has been received and/or determined, method 400 may proceed to receive contextual data, at 415. The contextual data may include data related to users related to the first user (e.g., the second user). In an example, the contextual data includes organizational graph data which may include information about relationships between users. For example, the organizational graph data may include data about the relationship between the first user and the second user (e.g., user roles in an organization, whether they are part of a team, boss/subordinate relationship, and the like).

Once the required data has been received, method 400 may proceed to provide the user history data of connection and the contextual data to a trained ML model for identifying connection suggestions for the first user, at 415. The trained ML model may be a model such as the connection identifier model 152 of FIG. 1B, which may utilize parameters such as user data and contextual data and facility data to identify a suggested connection for the first user.

After providing the inputs to the ML model, method 400 may proceed to receive the identified suggestion (e.g., second user) as an output from the ML model, at 425. Method 400 may then provide the identified connection for display, at 435. This may involve transmitting display data to an application. In some implementations, the display data includes information identifying the second user (e.g., the user's name or user identification), information about the last time the first user and the second user connected, the type of connection last made and/or a suggested type of connection. Once, the data is provided for display, method 400 may end at 440.

Figure 5:
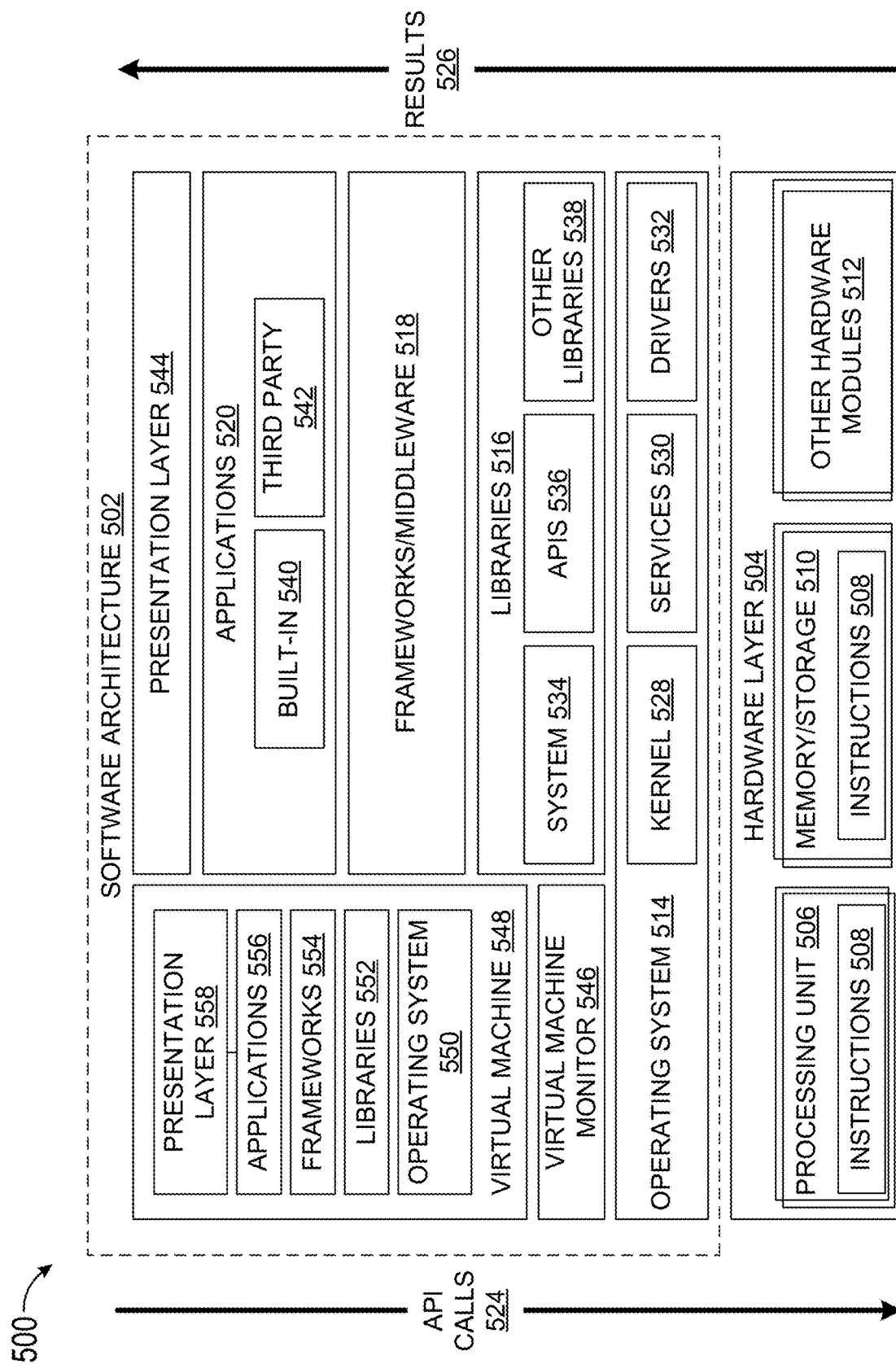
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
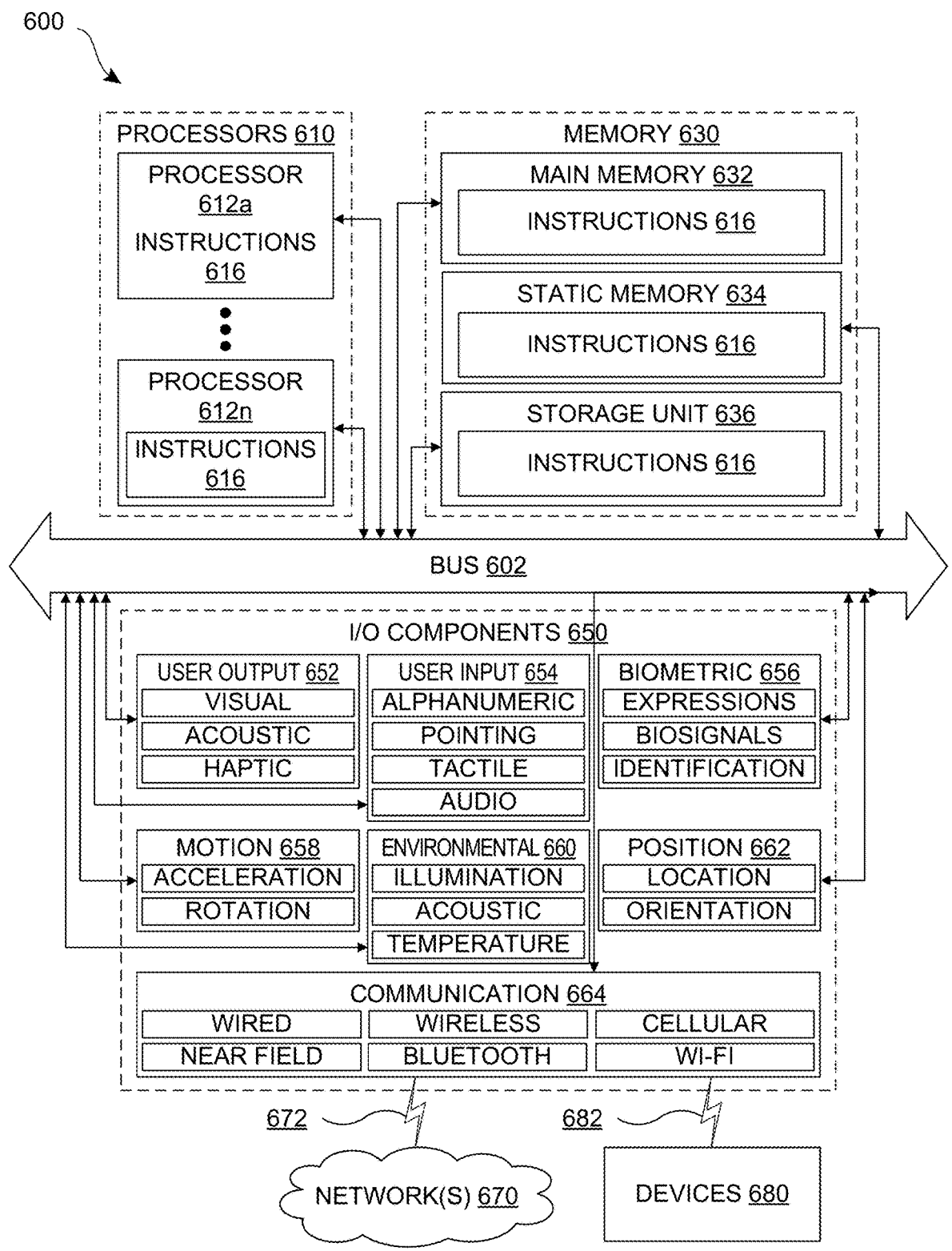
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors $612a$ to $612n$ that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving data relating to a first user's history of connections with other users;
receiving contextual data about the first user, the contextual data including organizational graph data;
providing the data and the contextual data as inputs to a trained machine-learning (ML) model for identifying a second user for the first user to connect with based on the data and the contextual data;
receiving the identified second user as an output from the trained ML model; and
providing the identified second user as a connection suggestion for display in a user interface element.

Item 2. The data processing system of item 1, wherein identifying the second user is further based on at least one of a weakening connection with the first user, bias in the first user's connections, and achieving an objective.

Item 3. The data processing system of item 2, wherein achieving an objective includes at least one of achieving a career objective, achieving a project objective, and achieving a company objective Item 4. The data processing system of any preceding item, wherein the memory comprises executable instructions that, when executed by processor, further cause the data processing system to perform functions of:
determining a location of the first user and the second user; and
providing the identified second user as the connection suggestion when the location of the first user is within a given geographical proximity to the location of the second user at a given time.

Item 5. The data processing system of claim 4, wherein providing the identified second user as the connection suggestion includes providing at least one of the given time, the location of the first user, and the location of the second user for display.

Item 6. The data processing system of claim 4, wherein the location of the first user is determined by using at least one of user data, contextual data, and facility data.

Item 7. The data processing system of any preceding item, wherein the memory comprises executable instructions that, when executed by processor, further cause the data processing system to perform functions of:
receiving a request to schedule a meeting;
providing information about the meeting as an input to the trained ML model; and
receiving the identified second user as a suggested meeting attendee for the meeting from the trained ML model.

Item 8. The data processing system of any preceding item, wherein the memory comprises executable instructions that, when executed by processor, further cause the data processing system to perform functions of displaying a selectable user interface element for making a connection with the second user.

Item 9. A method for facilitating convergence comprising:
receiving data relating to a first user's history of connections with other users;
receiving contextual data about the first user, the contextual data including organizational graph data;
providing the data and the contextual data as inputs to a trained machine-learning (ML) model for identifying a second user for the first user to connect with based on the data and the contextual data;
receiving the identified second user as an output from the trained ML model; and
providing the identified second user as a connection suggestion for display in a user interface element.

Item 10. The method of item 9, wherein identifying the second user is further based on at least one of a weakening connection with the first user, bias in the first user's connections, and achieving an objective.

Item 11. The method of items 9 or 10, further comprising:
determining a location of the first user and the second user; and
providing the identified second user as the connection suggestion when the location of the first user is within a given geographical proximity to the location of the second user at a given time.

Item 12. The method of item 11, wherein providing the identified second user as the connection suggestion includes providing at least one of the given time, the location of the first user, and the location of the second user for display.

Item 13. The method of item 11, wherein the location of the first user is determined by using at least one of user data, contextual data, and facility data.

Item 14. The method of any of items 9-13, further comprising:
receiving a request to schedule a meeting;
providing information about the meeting as an input to the trained ML model; and
receiving the identified second user as a suggested meeting attendee for the meeting from the trained ML model.

Item 15. The method of any of items 9-14, further comprising displaying a selectable user interface element for making a connection with the second user.

Item 16. A non-transitory computer readable medium on which are stored instructions that, when executed, cause a programmable device to perform functions of:
receiving data relating to a first user's history of connections with other users;
receiving contextual data about the first user, the contextual data including organizational graph data;
providing the data and the contextual data as inputs to a trained machine-learning (ML) model for identifying a second user for the first user to connect with based on the data and the contextual data;
receiving the identified second user as an output from the trained ML model; and
providing the identified second user as a connection suggestion for display in a user interface element.

Item 17. The non-transitory computer readable medium of item 16, wherein identifying the second user is further based on at least one of a weakening connection with the first user, bias in the first user's connections, and achieving an objective.

Item 18. The non-transitory computer readable medium of items 16 or 17, wherein the instructions when executed, further cause a programmable device to perform functions of:
  determining a location of the first user and the second user; and
  providing the identified second user as the connection suggestion when the location of the first user is within a given geographical proximity to the location of the second user at a given time.

Item 19. The non-transitory computer readable medium of item 18, wherein providing the identified second user as the connection suggestion includes providing at least one of the given time, the location of the first user, and the location of the second user for display.

Item 20. The non-transitory computer readable medium of any of items 16-20, wherein the instructions when executed, further cause a programmable device to perform functions of:
  receiving a request to schedule a meeting;
  providing information about the meeting as an input to the trained ML model; and
  receiving the identified second user as a suggested meeting attendee for the meeting from the trained ML model.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions.

The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
  a processor; and
  a memory in communication with the processor, the memory comprising executable instructions that, when executed by the processor, cause the data processing system to perform functions of:
    receiving data relating to a first user's history of connections with other users;
    receiving contextual data about the first user, the contextual data including organizational graph data;
    providing the data and the contextual data as inputs to a trained machine-learning (ML) model for identifying a second user for the first user to connect with based on the data, the contextual data, and a geographic proximity of the first user to the second user, the second user being identified based on a determination that a connection between the first user and the second user is weakening or based on identification of bias in the first user's connections;
    receiving the identified second user as an output from the trained ML model; and
    providing the identified second user as a connection suggestion for display in a user interface element,
    wherein a training dataset used to train the trained ML model is continually updated and the trained ML model is regenerated to reflect updates to the training dataset.

2. The data processing system of claim 1, wherein identifying the second user is further based on achieving an objective.

3. The data processing system of claim 2, wherein achieving an objective includes at least one of achieving a career objective, achieving a project objective, and achieving a company objective.

4. The data processing system of claim 1, wherein the memory comprises executable instructions that, when executed by processor, further cause the data processing system to perform functions of:
  determining a location of the first user and the second user; and providing the identified second user as the connection suggestion when the location of the first user is within a given geographical proximity to the location of the second user at a given time.

5. The data processing system of claim 4, wherein providing the identified second user as the connection suggestion includes providing at least one of the given time, the location of the first user, and the location of the second user for display.

6. The data processing system of claim 4, wherein the location of the first user is determined by using at least one of user data, contextual data, and facility data.

7. The data processing system of claim 1, wherein the memory comprises executable instructions that, when executed by the processor, further cause the data processing system to perform functions of:
receiving a request to schedule a meeting;
providing information about the meeting as an input to the trained ML model; and
receiving the identified second user as a suggested meeting attendee for the meeting from the trained ML model.

8. The data processing system of claim 1, wherein the memory comprises executable instructions that, when executed by processor, further cause the data processing system to perform functions of displaying a selectable user interface element for making a connection with the second user.

9. A method for facilitating convergence, the method comprising,
with a processor and a memory comprising executable instructions for execution by the processor, performing each of:
receiving, at a connection identifier engine, data relating to a first user's history of connections with other users;
receiving, at a connection identifier engine, contextual data about the first user, the contextual data including organizational graph data;
providing the data and the contextual data as inputs to a trained machine-learning (ML) model for identifying a second user for the first user to connect with based on the data, the contextual data, and a geographic proximity of the first user to the second user, the second user being identified based on a determination that a connection between the first user and the second user is weakening or based on identification of bias in the first user's connections;
receiving the identified second user as an output from the trained ML model; and
providing the identified second user as a connection suggestion for display in a user interface element displayed by a client device,
wherein a training dataset used to train the trained ML model is continually updated and the trained ML model is regenerated using the updated training dataset to reflect updates to the training dataset;
the method further comprising:
determining a location of the first user and the second user; and
providing the identified second user as the connection suggestion when the location of the first user is within a given geographical proximity to the location of the second user at a given time.

10. The method of claim 9, wherein identifying the second user is further based on achieving an objective.

11. The method of claim 9, wherein providing the identified second user as the connection suggestion includes providing at least one of the given time, the location of the first user, and the location of the second user for display.

12. The method of claim 9, wherein the location of the first user is determined by using at least one of user data, contextual data, and facility data.

13. The method of claim 9, further comprising:
receiving a request to schedule a meeting;
providing information about the meeting as an input to the trained ML model; and
receiving the identified second user as a suggested meeting attendee for the meeting from the trained ML model.

14. The method of claim 9, further comprising displaying a selectable user interface element for making a connection with the second user.

15. A non-transitory computer readable medium on which are stored instructions that, when executed, cause a programmable device to perform functions of:
receiving data relating to a first user's history of connections with other users;
receiving contextual data about the first user, the contextual data including organizational graph data;
providing the data and the contextual data as inputs to a trained machine-learning (ML) model for identifying a second user for the first user to connect with based on the data, the contextual data, and a geographic proximity of the first user to the second user, the second user being identified based on a determination that a connection between the first user and the second user is weakening or based on identification of bias in the first user's connections;
receiving the identified second user as an output from the trained ML model; and
providing the identified second user as a connection suggestion for display in a user interface element,
wherein a training dataset used to train the trained ML model is continually updated and the trained ML model is regenerated using the updated training dataset to reflect updates to the training dataset.

16. The non-transitory computer readable medium of claim 15, wherein identifying the second user is further based on achieving an objective.

17. The non-transitory computer readable medium of claim 15, wherein the instructions when executed, further cause a programmable device to perform functions of:
determining a location of the first user and the second user; and
providing the identified second user as the connection suggestion when the location of the first user is within a given geographical proximity to the location of the second user at a given time.

18. The non-transitory computer readable medium of claim 17, wherein providing the identified second user as the connection suggestion includes providing at least one of the given time, the location of the first user, and the location of the second user for display.

19. The non-transitory computer readable medium of claim 15, wherein the instructions when executed, further cause a programmable device to perform functions of:
receiving a request to schedule a meeting;
providing information about the meeting as an input to the trained ML model; and
receiving the identified second user as a suggested meeting attendee for the meeting from the trained ML model.

* * * * *